Jan. 1, 1952   F. J. WAGNER   2,580,489
BEARING FOR ROLLER SKATE WHEELS
Filed May 10, 1947

INVENTOR
Frank J. Wagner
BY Gustav Drews
    ATTORNEY

Patented Jan. 1, 1952

2,580,489

UNITED STATES PATENT OFFICE 2,580,489

BEARING FOR ROLLER SKATE WHEELS

Frank J. Wagner, Franklin Square, N. Y., assignor of one-half to Carroll M. Bierman, Franklin Square, N. Y., and Elizabeth Wagner, administratrix of said Frank J. Wagner, deceased, assignor of one-half to Elizabeth Wagner, Franklin Square, N. Y.

Application May 10, 1947, Serial No. 747,302

2 Claims. (Cl. 301—5.7)

This invention relates to roller skate wheels and particularly to the bearings for roller skate wheels.

Among the objects of the present invention, it is aimed to provide an improved bearing for a roller skate wheel including two pairs of ball bearing raceways, one pair of which is fixed between the wheel and the shaft, and one raceway of the other pair fixed on the shaft while the outer raceway of the second pair is free in an axial direction relative to the axis of the shaft for self-adjustment.

It is still another object of the present invention to provide an improved bearing for a roller skate wheel including two pairs of ball bearing raceways, the inner raceways of which are spaced from one another by a slidably mounted spacer on the shaft or axle of the skate and one of the outer raceways of which is fixed in its position relative to the wheel to facilitate self-adjustment of the raceways relative to the wheel and shaft.

Figure 1:
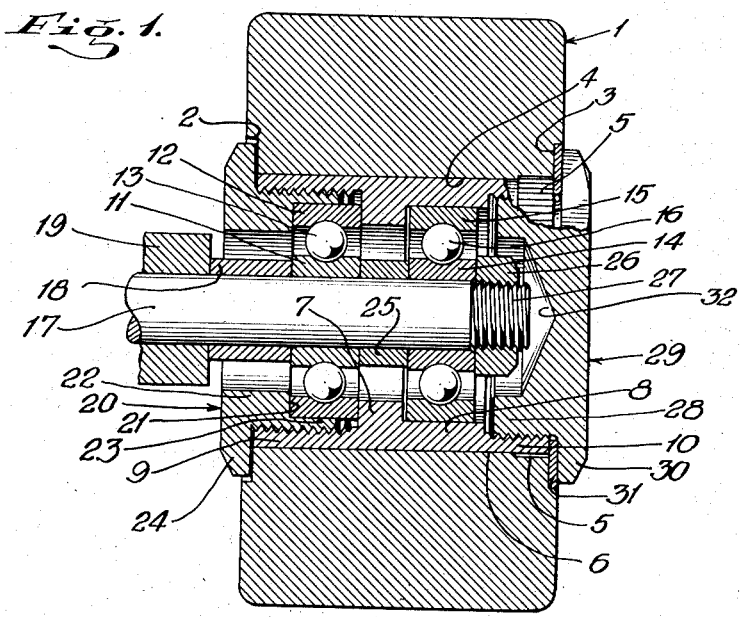

These and other features, capabilities and advantages of the present invention will appear from the subjoined detail description of one specific embodiment illustrated in the accompanying drawings, in which Fig. 1 is a transverse section of the bearing including the wheel and part of the axle.

Figure 2:
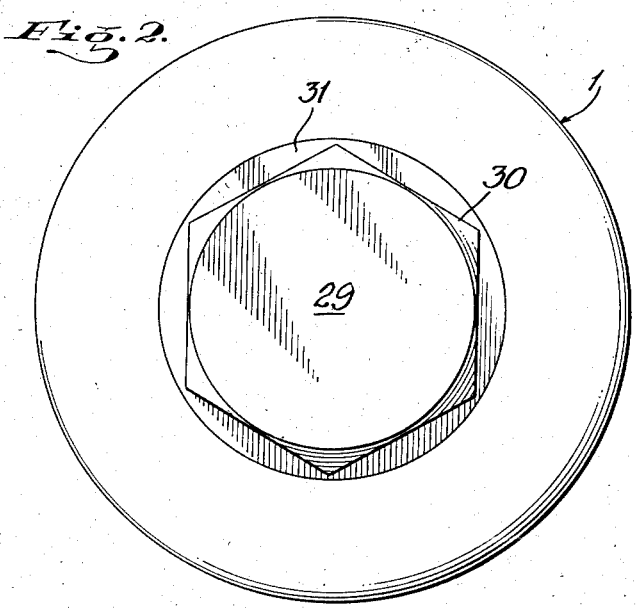

Fig. 2 is a side elevation of the wheel mounted on the bearing.

In the embodiment shown, there is illustrated a roller skate wheel having a cylindrical tread portion 1 composed of any suitable material, although for professional skating, particularly on wooden stages or wooden floors, the tread portion is preferably composed of wood. This tread portion in the present instance is provided with annular recesses 2 and 3 extending radially from the central opening 4. Preferably one end of the recess 4, as shown, is forced onto the fluted portion 5 of the main metal sleeve 6 which has an inwardly extending radial annulus 7, a little to one side of the middle of the sleeve, continuing in an annular enlargement 8 and then into two axially extending diminished portions 9 and 10 provided with internal threads, the outer edges of the diminished portions 9 and 10 in the present instance being substantially flush with the outer radially extending faces of the recesses 2 and 3, respectively.

In the present instance there are provided two pairs of ball bearing raceways, the inner pair including the complemental raceways 11 and 12 carrying the balls 13 between them, and the outer pair including the complemental raceways 14 and 15 carrying the balls 16 between them. The inner pair of raceways 11 and 12 are first mounted on the axle 17 against the shoulder forming spacer 18 interposed between the raceway 11 and the hub 19 of the axle 17 with the inner nut 20 mounted on the large raceway 12 so that the annular shoulder 21 of its enlargement 22 engages the inner edge of the large raceway 12. The external thread of the diminished part 23 and enlargement 22 is screw threadedly connected to the internal thread of the diminished cylindrical portion 9 until the outer face of its head 24 approaches the inner face of the recess 2 and of the inner edge of the diminished portion 9, when the large raceway 12 will snugly engage the inner face of the annulus 7. In other words, the threaded relationship of the nut 20 and the diminished portion 9 is such that it will lock the large raceway 12 into fixed engagement with the inner face of the annulus 7. The head 24 in the present instance will be positioned in the recess 2 but its outer face will not necessarily engage the inner face of the recess 2, sufficient clearance being deliberately provided to insure definitely anchoring the large raceway 12 against movement relative to the nut 20 and annulus 7 and to allow for take up in case of wear. The spacer 18 may, of course, be fixed on the shaft 17 and may be disposed against the small raceway 11 after the large raceway 12 has been secured in position against the annulus 7 by the nut 20.

Thereupon a spacer 25 may be slidably mounted on the axle 17, the axial width of which spacer 25 is greater than the axial width of the annulus 7 for the purposes hereinafter to be described. Thereupon the outer pair of raceways 14 and 15 are mounted on the axle 17 and the nut 26 is secured to the threaded end 27 of the axle 17 to lock the inner raceway 14 between the nut 26 and the spacer 25 when the axle 17 will be locked to the tread 1 or vice versa. In this position it will be seen that the large raceway 15 will be spaced from the annulus 7, and consequently the clearance so provided will allow for slight variations and enable the raceways 14 and 15 to adjust themselves relative to the raceways 11 and 12, the axle 17 and the metal sleeve 6. In other words, the adjustment and movement will be about the large or radial outer raceway 12 which is fixed to the tread 1 between the annulus 7 and nut 20, with the spacer 18, the inner raceway 11, spacer 25 and inner raceway 14 constituting an articulated bearing for the axle 17 cooperating with the outer raceway 15 slidably mounted in the sleeve 6. In turn, the nut 26 is readily accessible when the nut 29 has been removed to enable clamping or adjusting the articulated bearing formed by the spacers 18 and 25 and inner raceways 11 and 14, more or less rigid depending upon the weight, strength and feel of the performer.

The opening in the enlargement 8 of the sleeve 6 is preferably conformed snugly to fit the large raceway 15, as shown, the diminished portion 10 of the sleeve 6 having an internal thread to receive the external thread of the diminished portion 28 of the outer nut 29, the head 30 of which in its final position engaging the flat ring 31 disposed in the recess 3 so that the ring 31 is secured between the head 30 and the outer face of the recess 3.

The nut 20 is, of course, provided with a central opening to clear the spacer 18 and axle 17, while the nut 29 is merely provided with a recess 32 to clear the end of the axle 17 and the nut 26.

While obviously the materials of the several parts may vary without departing from the general spirit of the invention, excellent results have been achieved when the tread 1 is composed of rock maple, the nuts 20 and 29 and the sleeve 6 of aluminum, the spacer 25 of brass, and the raceways 11, 12, 14 and 15 of steel.

It is obvious that various changes and modifications may be made to the details of construction without departing from the general spirit of the invention as set forth in the appended claims.

I claim:

1. In a roller skate wheel, the combination of an axle having an annular shoulder spaced from the free end thereof and a threaded portion at the outer end thereof, a tread having a central chamber to receive a sleeve fixed in said tread and having a radially extending annulus spaced from the ends thereof with a smooth annular seat on one side of said annulus and an internally threaded annular chamber on the other side of said annulus, two pairs of ball bearing raceways, the said pairs of raceways being axially spaced, each pair comprising a radially inner and a radially outer raceway, a first spacer on the axle between the radially inner raceway of the axially inner pair of raceways and said shoulder, a second spacer on the axle between the radially inner raceways of the two pairs of raceways, a small nut screw threadedly connected to the threaded end of the axle and anchoring the two spacers and the two radially inner raceways between said small nut and said shoulder, the radially outer raceway of the axially outer pair of raceways slidably mounted in said smooth annular seat, and a large chambered nut spaced from the axle and screw threadedly connected to the inner threaded chamber of said sleeve, said large nut having an annular seat for the radially outer raceway of the axially inner pair of raceways and cooperating with said annulus to fix said latter radially outer raceway against movement relative to said annulus.

2. The combination as set forth in claim 1 characterized by a second large nut connected to said sleeve adjacent to said smooth annular seat but clear of said axially outer raceway and having a central recess to clear the small nut of the axle.

FRANK J. WAGNER.

REFERENCES CITED

The following references are of record in the file of this patent:

UNITED STATES PATENTS

| Number | Name | Date |
|---|---|---|
| 1,849,344 | Bartlett et al. | Mar. 15, 1932 |
| 2,252,132 | Mazveskas et al. | Aug. 12, 1944 |
| 2,432,105 | Wagner | Dec. 9, 1947 |
| 2,440,650 | Batesole | Apr. 27, 1948 |